Jan. 13, 1942.   O. U. ZERK   2,269,642
ICE TRAY
Filed May 3, 1938   8 Sheets-Sheet 1
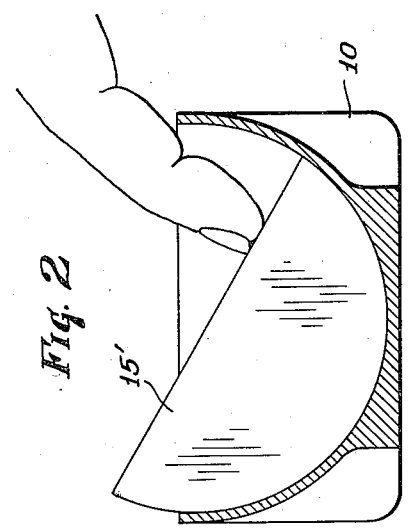
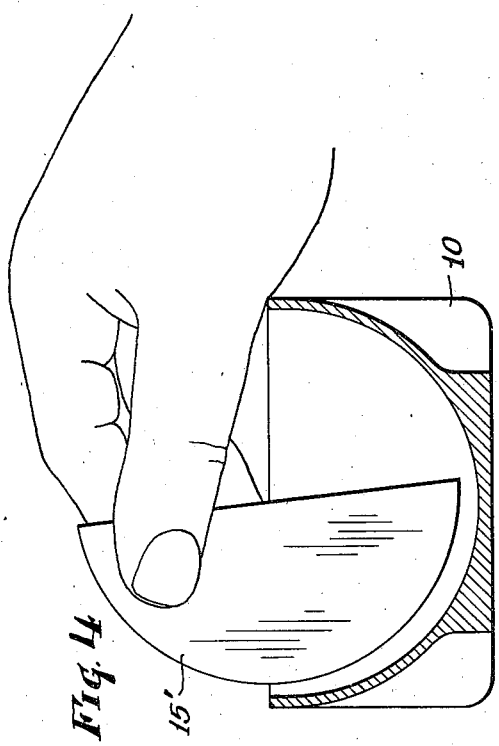
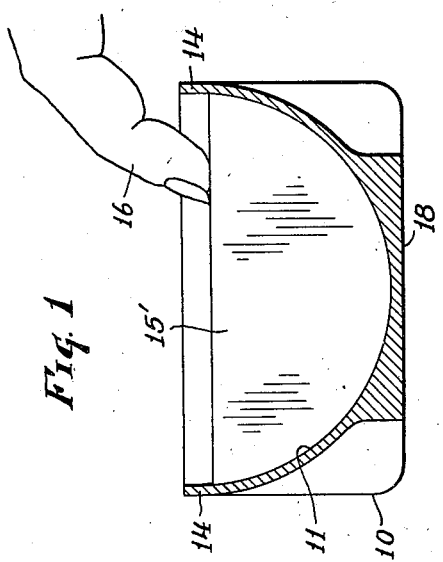
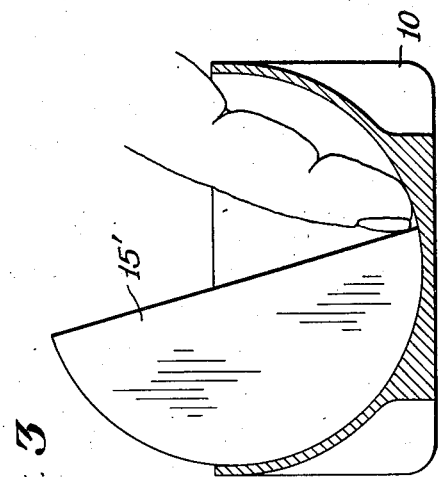
INVENTOR.
Oscar U. Zerk
BY
His ATTORNEY.

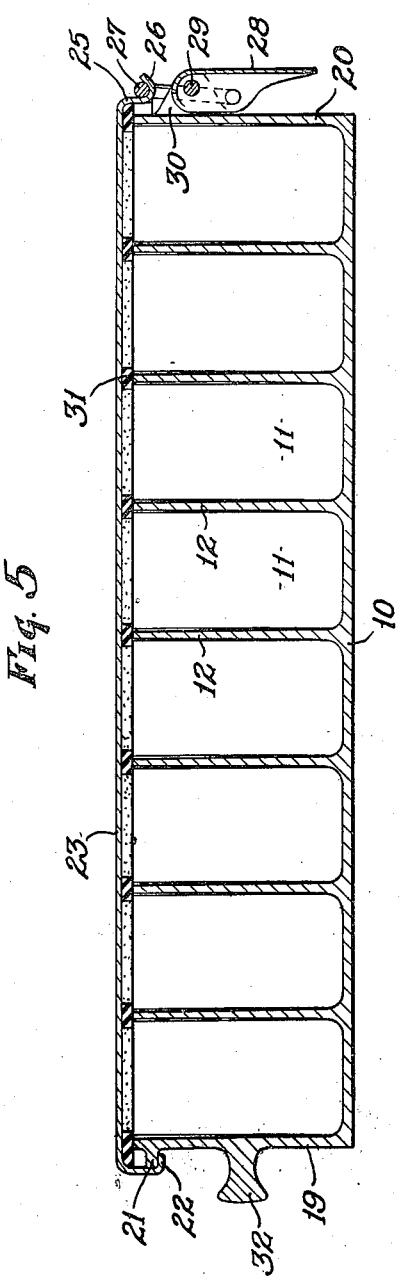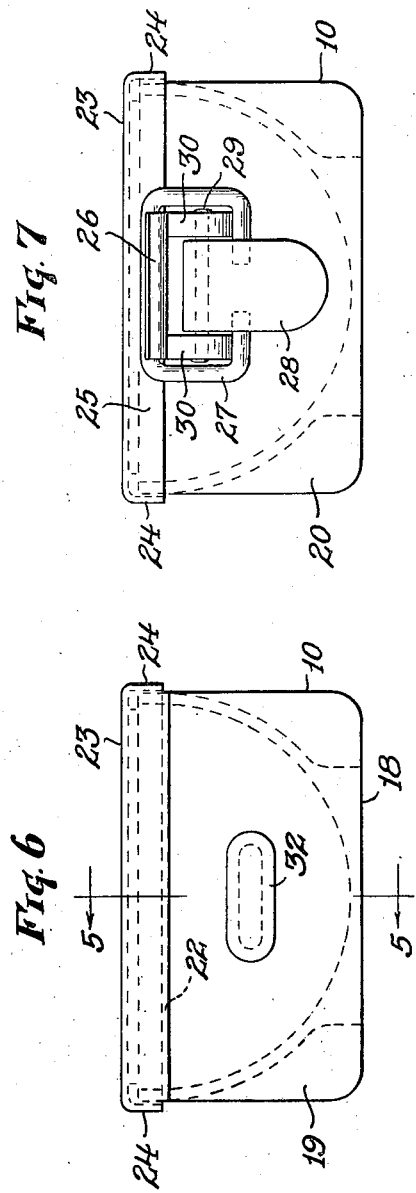

Jan. 13, 1942.                O. U. ZERK                2,269,642
                              ICE TRAY
                        Filed May 3, 1938           8 Sheets-Sheet 3
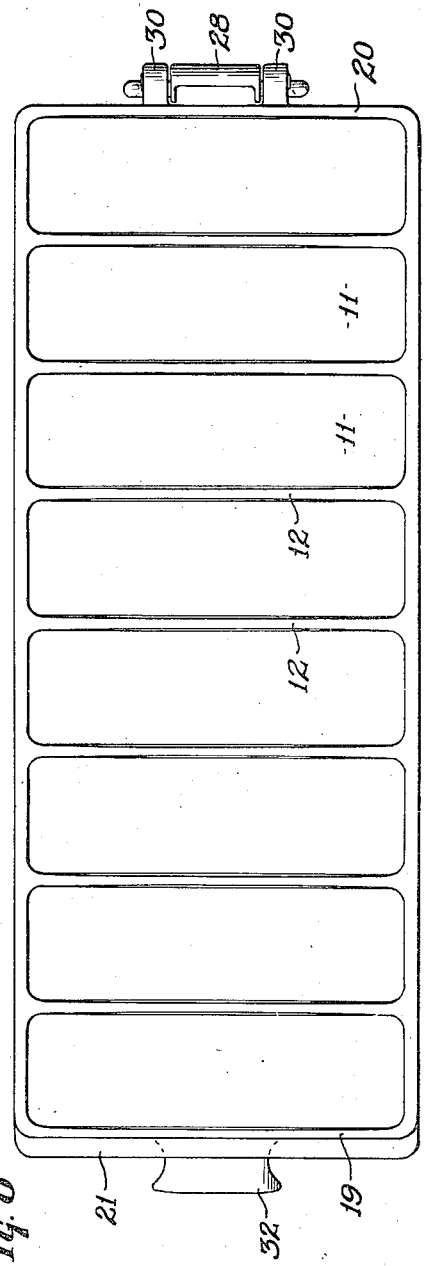
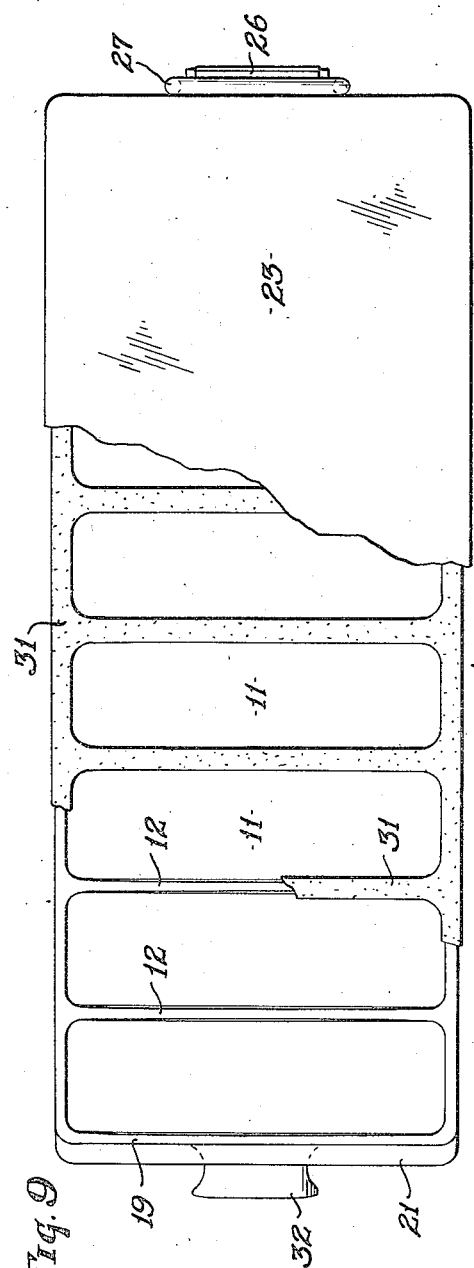
INVENTOR.
Oscar U. Zerk
BY
Frank M. Slough
His ATTORNEY.

Jan. 13, 1942.     O. U. ZERK     2,269,642
ICE TRAY
Filed May 3, 1938     8 Sheets-Sheet 4
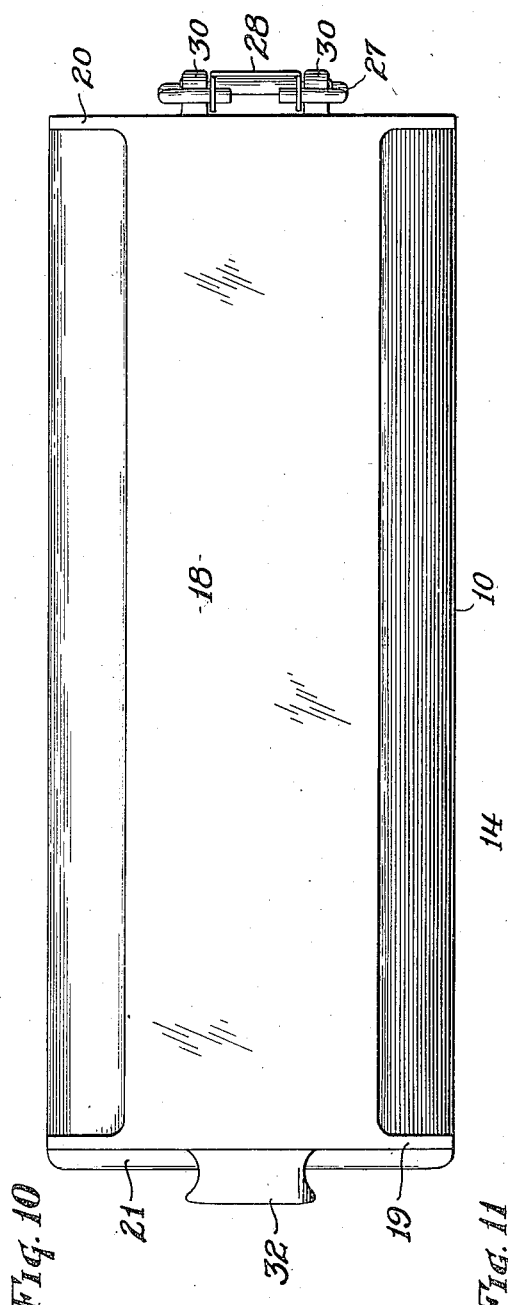
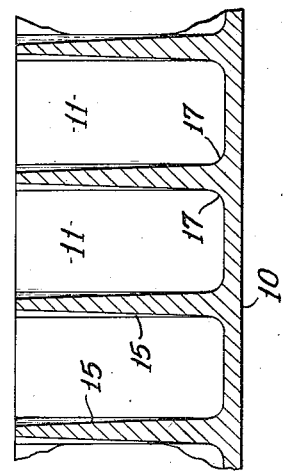
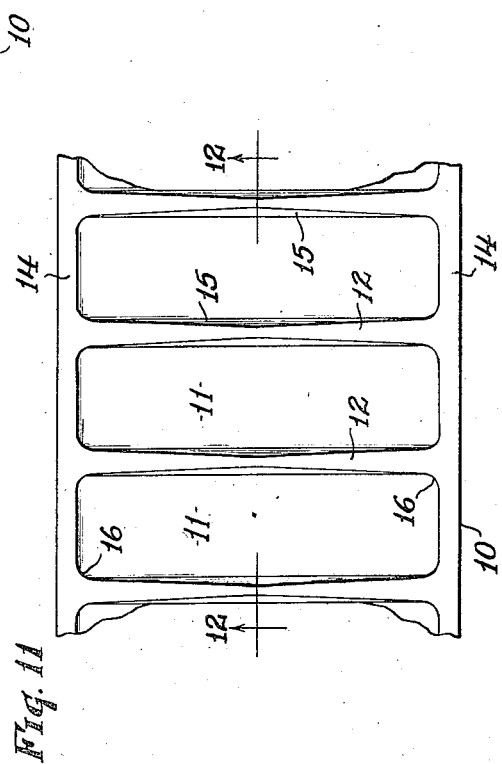
INVENTOR.
Oscar U. Zerk
BY Frank M. Smith
His ATTORNEY.

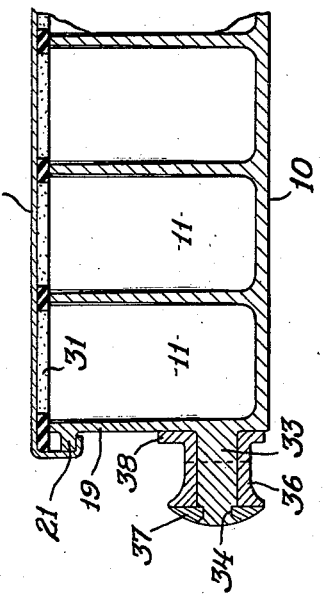
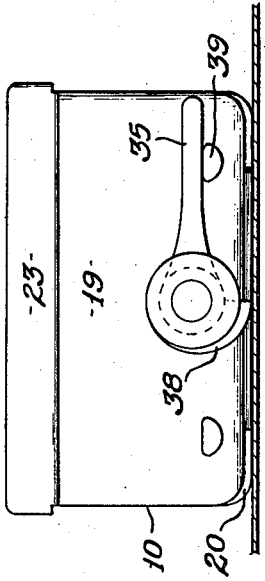
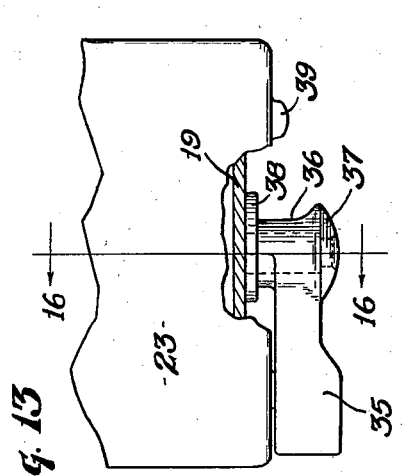
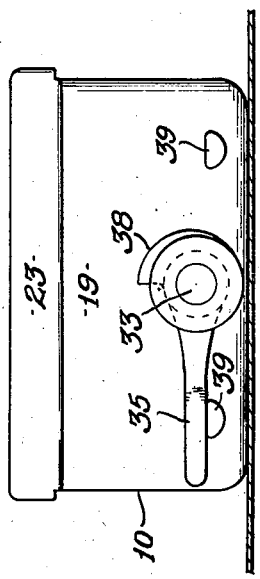

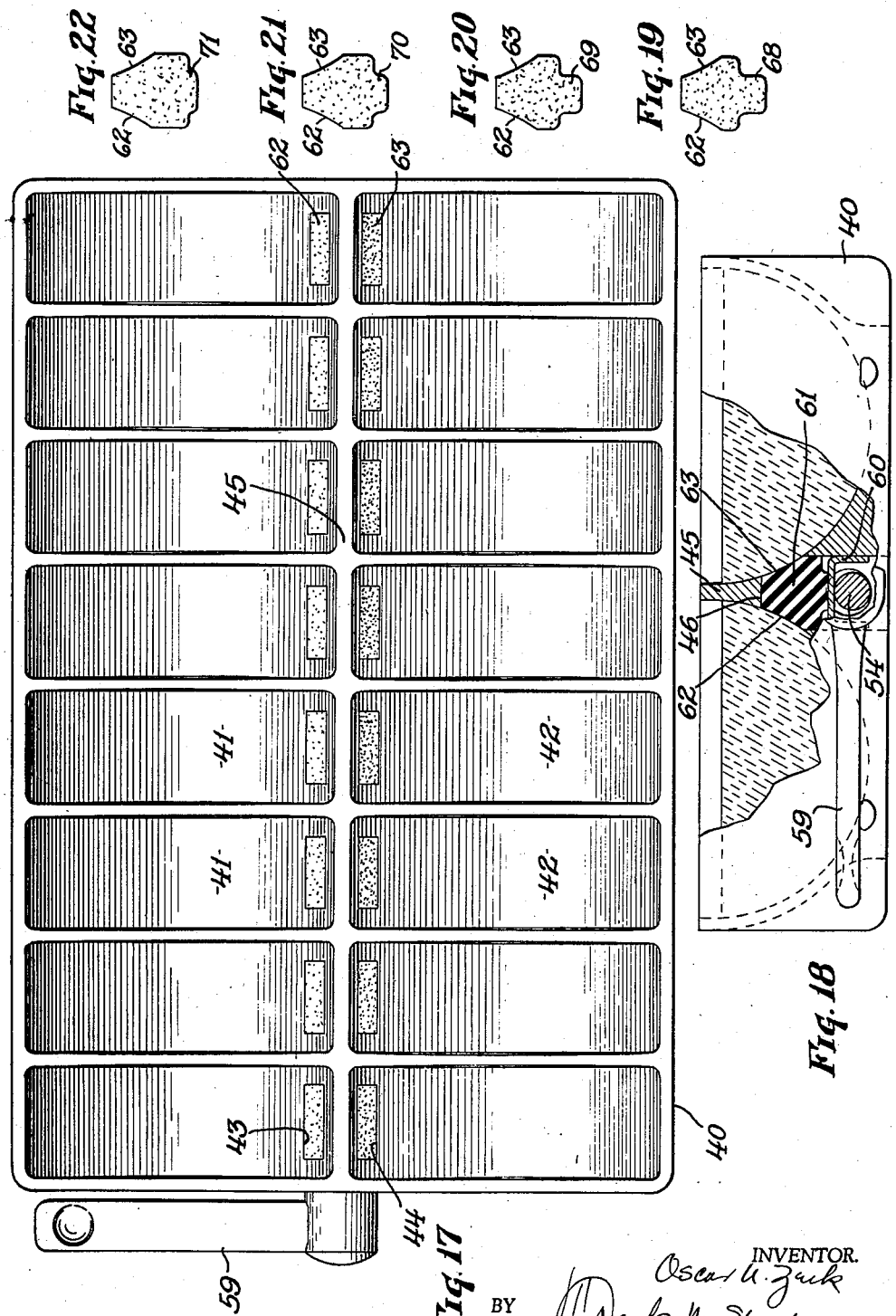

Jan. 13, 1942.   O. U. ZERK   2,269,642
ICE TRAY
Filed May 3, 1938   8 Sheets-Sheet 7
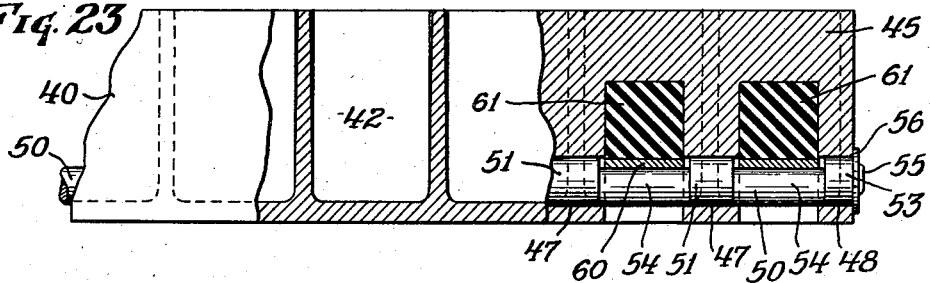
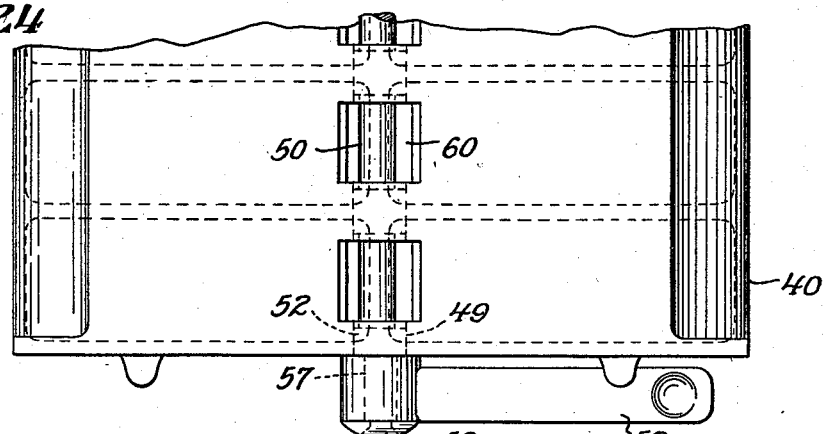
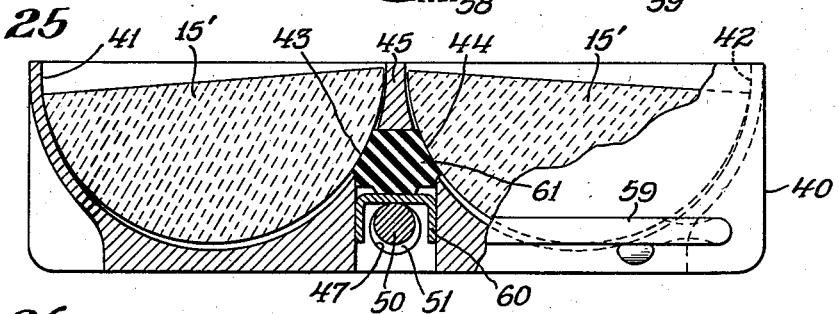
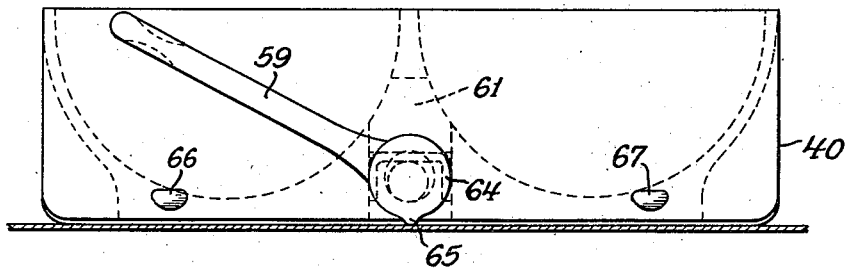
INVENTOR.
Oscar U. Zerk
BY
ATTORNEY.

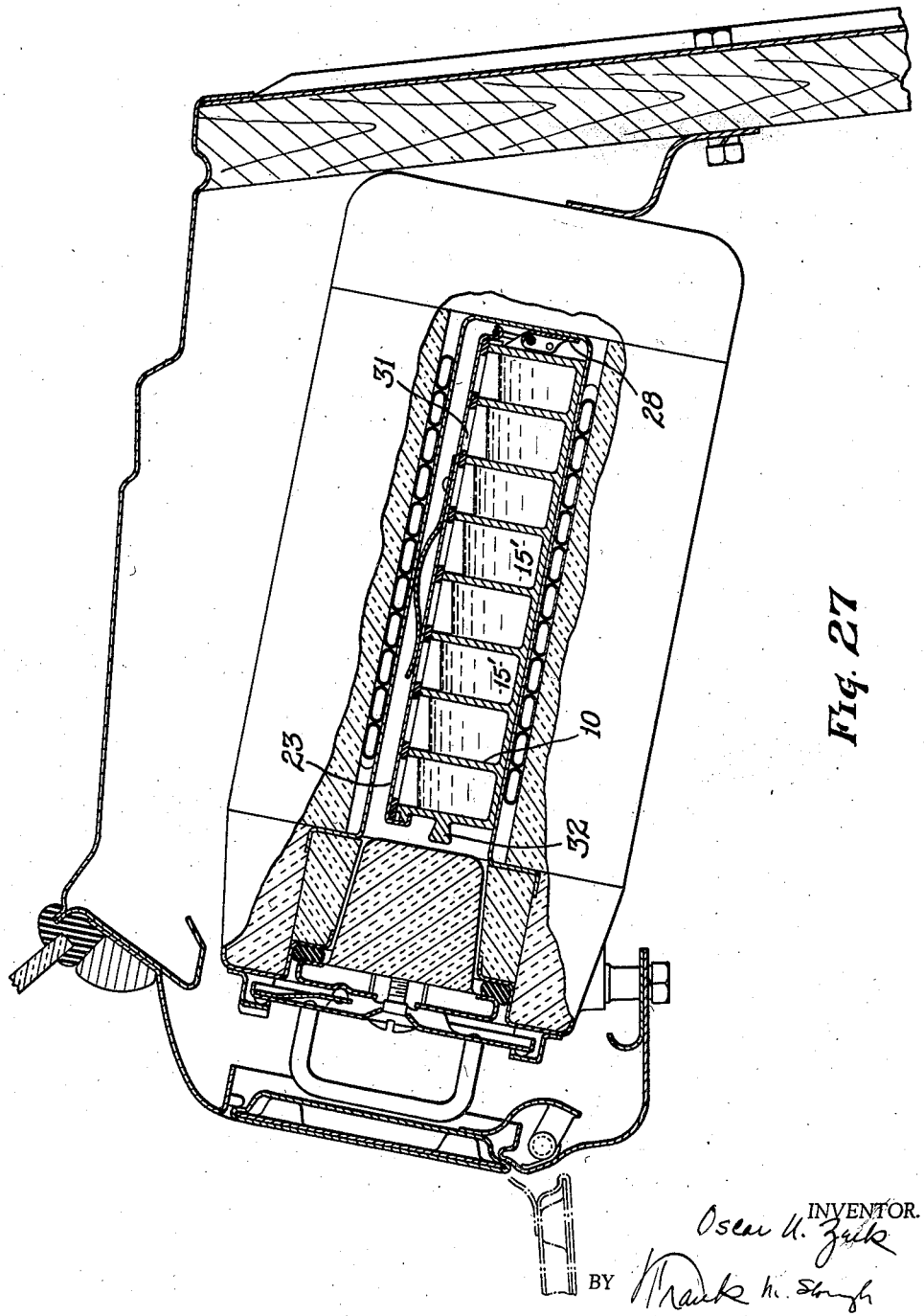

Patented Jan. 13, 1942

2,269,642

UNITED STATES PATENT OFFICE 2,269,642

ICE TRAY

Oscar U. Zerk, Chicago, Ill.

Application May 3, 1938, Serial No. 205,708

15 Claims. (Cl. 62—108.5)

My invention relates to ice trays adapted to be used in electrical or mechanical refrigerators and relates more particularly to ice trays of such type primarily adapted to be used in automotive vehicles.

Certain of such automobile refrigerators are described and shown in my copending application Serial No. 205,707, filed May 3, 1938, and I contemplate the use of ice trays as described herein in automobile refrigerators of the general type shown in this application.

Because of the problems which are encountered in automobile refrigerators which differ from those encountered in stationary refrigeration systems due to the car moving, its intermittent operation and the shocks imposed on the same when moving which are transmitted to a refrigerator disposed therein and its associated parts, ice trays which are to be used in automobile refrigerators must be particularly constructed to meet the same.

In domestic refrigerators the trays, if of metal, may be removed from the refrigerator and placed under a warm water supply at a sink to facilitate removal of the ice cubes formed therein. In a refrigerator placed within an automotive vehicle obviously no such warm water supply is available and the tray must be constructed in a manner to facilitate removal of ice cubes formed therein without recourse to such a water supply.

An object of my invention therefor is to provide an improved ice tray.

Another object of my invention is to provide an improved ice tray of the type adapted for use in connection with automotive refrigerators.

Another object of my invention is to provide an improved ice tray adapted for use in connection with automotive refrigerators which will permit easy removal of ice units formed therein.

Another object of my invention is to provide an improved ice tray adapted for use in connection with automotive refrigerators which will permit easy removal of ice units formed therein without inverting the tray.

Another object of my invention is to provide an improved ice tray for automotive refrigerators which shall be of such an improved construction as to prevent spilling of water therefrom or passage of water from one individual compartment to another due to movement of the vehicle or parking of the vehicle in an inclined position.

Another object of my invention is to provide an improved ice tray having improved means for removing predetermined groups of frozen units from the tray.

Another object of my invention is to provide an improved ice tray having improved means for releasing the tray from the evaporator for removal from the refrigerator.

Another object of my invention is to provide an improved ice tray having common means for both releasing the tray from the evaporator and the ice units from the tray.

Other objects of my invention and the invention itself will become more apparent from reference to the accompanying drawings, wherein:

Fig. 1 is a transverse section through a preferred form of tray which I employ showing a frozen liquid unit therein in its normal position at the completion of the freezing operation, but after the frozen contact of the ice unit with the tray has been broken due to a small period of surface melting;

Fig. 2 is a view generally similar to Fig. 1 showing the frozen unit or semi-disc moved to a relatively angular position due to finger pressure applied to one side of the unit;

Fig. 3 is a view showing the position the unit of Fig. 2 assumes with continued finger pressure at one side of the unit;

Fig. 4 shows the frozen unit being grasped intermediate the thumb on one side and the index and middle finger on the other side prior to removal from the tray;

Fig. 5 is a longitudinal medial section through the tray illustrated in Figs. 1 to 4 inclusive;

Fig. 6 is a left end elevational view of the tray illustrated in Fig. 5;

Fig. 7 is a right end elevational view of the tray illustrated in Fig. 5;

Fig. 8 is a top plan view of the tray of Fig. 5 with the top cover and gasket removed;

Fig. 9 is a view similar to Fig. 8 showing a portion of the top cover and gasket in place;

Fig. 10 is a bottom plan view of the tray illustrated in Fig. 8;

Fig. 11 is a fragmentary top plan view similar to Fig. 8 but showing the form of the partition providing individual compartment in an exaggerated manner;

Fig. 12 is a section taken along the line 12—12 of Fig. 11;

Fig. 13 is a fragmentary top plan view of the tray with the cover in place and with the parts broken away to show contact breaking means between the tray and evaporator;

Fig. 14 is an end elevational view of the tray illustrated in Fig. 13 with the breaking means in inoperative position;

Fig. 15 is a view similar to Fig. 14 after the breaking means has been operated to break the contact between the tray and evaporator;

Fig. 16 is a section taken along lines 16—16 of Fig. 13;

Fig. 17 is a top plan view of a modified form of double row ice tray with the cover means removed and wherein mechanical means are employed to break the contact of the individual ice units from the tray before any appreciable surface melting is incurred;

Fig. 18 is a left end elevational view of the tray of Fig. 17 with parts broken away for clearer illustration;

Fig. 19 is an end elevational view of a resilient pusher element which I may employ in connection with the tray of Figs. 17 and 18;

Figs. 20, 21 and 22 are views similar to Fig. 19 but showing successively modified forms of pusher elements;

Fig. 23 is a fragmentary side elevational view of the tray of Fig. 17 partially broken away along a plane to the longitudinal center of one row of ice units and further broken away along a plane including the longitudinal center of the tray;

Fig. 24 is a fragmentary plan view of the tray of Fig. 17;

Fig. 25 is an end view of the tray of Fig. 17, partially in transverse section, showing two ice units partially lifted, and Fig. 26 is a left end elevational view of the tray illustrated in Fig. 17;

Fig. 27 is a side elevational view of a refrigerator cabinet attached to parts of an automotive vehicle showing in section the improved ice tray of my invention employed therein.

Referring now to the drawings, and referring more particularly to Figs. 1 to 5 inclusive, I have indicated generally at 10 an ice tray preferably formed of aluminum and comprising preferably a plurality of substantially semi-circular compartments 11 divided by partitions 12. As best indicated in Fig. 1, the upper portion of the substantially semi-circular walls of each semi-circular compartment merges into straight wall portions 14, the wall portions 14 being either substantially parallel or slightly divergent upwardly. Since I preferably die cast the tray 10, a slight taper of the lateral walls of the compartment 11 or walls forming the partitions 12 is required in order that the core may be removed from the metal mold. I effect this, as best illustrated in Figs. 11 and 12, by making the opposite lateral walls of each compartment 11 of generally double conical form tapering divergently from the transverse opposite compartment ends 14—14 towards the longitudinal medial plane of the tray, as indicated at 15. The purpose of the substantially double conical formed lateral walls of the compartment will be subsequently described.

Referring now to Fig. 1, I have indicated a frozen liquid unit generally at 15′ which corresponds to the conventional ice cube although I contemplate that numerous other liquids than water may be frozen within the trays, the unit 15 being substantially in the form of a semi-circular disc. I have found that after the freezing operation is completed and the tray is withdrawn from the evaporator, sufficient surface melting will occur within a short period, such as three minutes, along the disc periphery and the sides so that when slight pressure of one's finger is thereafter applied at one side of the disc center, as indicated at 16 of Fig. 1, such pressure will cause the ice unit to rock in its substantially semi-circular base to a position substantially as illustrated in Fig. 2. Continued pressure by the finger will cause the unit 15 to assume the position illustrated in Fig. 3, permitting the unit to be easily grasped between the thumb on one side of the unit and the forefinger on the other side of the unit as illustrated in Fig. 4, and easily removed from the tray. Thus, by forming the freezing compartment of the tray to provide a frozen generally semi-circular disc, the frozen unit can quickly and easily be removed by employing only one hand if desired and without requiring that the tray be tilted from a normal horizontal position or inverted, thereby eliminating any tendency to spill such surface water as might be contained in the compartment. I have thereby eliminated the necessity of an available supply of warm water necessary to effect sufficient melting of the conventional ice cube to permit its removal by inverting the conventional tray. Further, the necessity of a drainage means such as a sink for water running from the tray when it is inverted due to melting ice and also caring for the drainage of the warm water supply is eliminated.

As hereinbefore stated, I preferably round the corners of a compartment as indicated at 16 and 17 of Figs. 11 and 12 to facilitate removal of the frozen semi-disc and for greater ease in die casting. The reason for forming the lateral walls of the compartment in substantially double conical form rather than straight tapered will become apparent by reference to Figs. 11 and 12 wherein it will be noted that to remove the unit the same is revolved substantially about the axis of the semi-disc and that the peripheral portion of the semi-disc lying in the plane of the horizontal axis, as viewed in Fig. 1, is of substantially the same width as the peripheral portion of the semi-disc in a plane including the vertical axis as viewed in Fig. 1, and if greater than the peripheral portion lying in a vertical plane through the vertical axis, would prevent rotation and removal of the unit.

Referring to Figs. 1 to 12 inclusive, it will be observed that the substantially semi-circular walls forming the compartment 11 are relatively thin permitting rapid conduction of heat therethrough with resultant relatively quick freezing of the liquid contained therein and that the walls merge into a flat base, generally indicated at 18. The front wall 19 and rear wall 20 of the tray are extended to assume generally rectangular form to increase the stability of the tray while permitting the tray base intermediate the end walls to remain relatively thin for rapid heat conduction.

As illustrated best in Figs. 1 to 4 inclusive, my improved ice tray is provided with an integral flat bottom or base which permits a flat surface contact, 18, of considerable area, with the underlying flat supporting evaporator surface, instead of a line contact, if the flat base were not provided and a merely tangential contact were had between an arcuate bottom surface for said tray.

This flat base construction, where the base is vertically thin, as shown, provides, in combination with the advantages of the half round ice discs, efficient freezing by the evaporator through the base.

The front wall 19 is provided with a transversely extending lip 21 adapted to have a hook portion 22 of a metal cover 23 hooked thereunder. The hook portion 22 of the cover is provided by bending inwardly the lower end of a depending front flange of the cover, the front flange joining depending side flanges 24—24 which continue to a rear depending flange 25. Centrally of the rear flange 25, a hooked portion 26 is provided integrally formed therewith and adapted to be engaged by the upper arm of a generally rectangular loop member 27 whose confronting lower ends are pivoted about a pin 29, the pin 29 being supported by transversely spaced ears 30—30 formed integrally with the rear wall 20 of the tray and provided with aligned perforations for reception of the pin 29.

A sealing gasket 31 preferably formed of rubber engages the top peripheral surfaces of the tray and also of the partitions 12 and is disposed beneath the cover 23 whereby upon filling the compartment to a desired level with liquid, the hook portion 22 of the cover may be disposed beneath lip 21 of the front wall 19 and the handle 28 elevated to a horizontal position whereupon the loop element 27 will be raised to permit the top arm thereof to be disposed over the hooked portion 26 of the cover, thereby pressing the handle 28 downwardly to the position illustrated in Fig. 5, and the cover and the gasket will be securely clamped to the tray.

Thus, despite any vibration to which the tray may be subjected or any angle to which the tray may be inclined, the liquid in any individual compartment remains sealed therein.

It is to be noted that there are no interconnecting openings or passages between the different compartments of the ice tray, as is the custom in household refrigerator ice trays, and for ice trays employed in automobile heat insulated cabinets, this is a distinct advantage since otherwise liquid would unduly accumulate in end compartments due to motion of the car and sudden starting and stopping movements.

Due to the fact that the compartments 11 are individually sealed and no communicating means are provided therebetween, there is no danger of water from one compartment passing to another if the vehicle is parked at an inclined position and any tendency of the liquid in any lower compartments to be frozen with these compartments flooded and the upper compartment only partially filled is eliminated.

In order to withdraw the tray from the evaporator and to secure a gripping means for lifting the tray, to break the contact between the base of the tray and evaporator, I provide a handle 32 preferably integrally formed with the front base 19 of the tray. It will be observed that the handle 32 is relatively wide but only extends outwardly from the front base of the tray a sufficient distance to place the fingers thereunder and that the handle 28 when in locked position, is relatively close to the rear base of the tray so that a minimum of additional space is required in the evaporator to accommodate the handle in locking position.

Referring now to Figs. 13 to 16 inclusive, I have shown a tray generally similar to that illustrated in Figs. 1 to 12 inclusive, but wherein the handle 32 may be omitted and replaced by the arrangement shown in these figures and adapted mechanically to break the contact between the tray and the supporting surface of the evaporator. The front wall 19 of the tray centrally thereof and adjacent the tray base is provided with a pin 33 having a reduced shoulder 34 on the pin preferably being formed integrally with the tray. A lever 35 is provided with a hub 36 which is telescoped over the pin 33 and pivotally secured thereto by disposing the collar 37 over the shoulder pin 34 and flanging the pin end to lock the collar thereto. The said hub 36 is further provided with an eccentric or camming portion 38 which will effect gradual lifting of the forward end of the tray when the lever is rotated from the position illustrated in Fig. 14 to the position shown in Fig. 15 due to engagement of the eccentric portion 38 with the supporting surface for the tray. To support the lever in the position shown in either Fig. 14 or 15, I provide stops 39 preferably integrally formed with the front face 19 of the tray. This arrangement provides an effective means for breaking the contact when the tray becomes frozen to the evaporator.

Referring now to Figs. 17 to 26 inclusive, I have shown a modified form of tray, generally indicated at 40, comprising a double row of liquid receiving compartments, as indicated at 41 and 42. Each of the compartments 41 and 42 are similar to compartments 11, previously described, with the exception that generally rectangular perforations, as indicated at 43 and 44, are provided in the substantially semi-cylindrical walls of each of said compartments. The longitudinally extending partition 45 between the compartments 41 and 42 is provided with a plurality of generally rectangular perforations extending upwardly from the base and centrally of the compartments 41 and 42 and the openings in the partition 45 merge upwardly with the openings 43 and 44 in the compartments 41 and 42 and a shoulder 46 is provided intermediate such openings 43 and 44. A shaft 50 is disposed along the longitudinal axis of the tray and is provided with bearing portions 51 journaled in aligned bores 47 extending intermediate the openings in the partition 45 and bearing portions 52 and 53 journaled in bores 49 and 48 respectively provided in the front and rear walls of the tray respectively. The bearing portions of the shaft have eccentric portions 54 coaxially disposed therewith whereby when the shaft 50 is rotated, the eccentric portions 54 will move vertically. The rear end of the shaft is provided with a reduced shoulder 55 over which a washer 56 is telescoped and the shoulder 55 is then flanged to hold the washer in position. The forward portion of the shaft 50 is extended forwardly of the front base of the tray, as indicated at 57, and is provided with a reduced shoulder 58 whereby a handle 59 may be telescoped over the shaft portion 57 and rigidly secured thereto by flanging the shoulder portion 58. Any suitable means other than that described may be employed for locking the handle 59 with the shaft.

Disposed above each of the eccentric shaft portions 54 is a U-form pusher element 60 slidably disposed within the openings in the partition 45 and above each of said pusher elements 60 a generally keystone form resilient plug 61 having opposite arcuate portions 62 and 63, substantially conforming in contour to the substantially semi-cylindrical walls in compartments 41 and 42, is disposed. I preferably form the resilient plugs 61 of natural or synthetic rubber or other resilient material and the area of the portions 62 and 63 is slightly greater than the openings 43 and 44 of the adjoining compartments 41 and 42 to prevent leakage of liquid prior to freezing.

Referring to Fig. 18, the plug 61 is shown in a position wherein the surfaces 62 and 63 thereof plug the openings 43 and 44 and the plug is substantially flush with the substantially semi-cylindrical walls of the compartment, the pusher element 60 and shaft portions 54 being in their lowermost positions. Fig. 26 illustrates the handle 59 as partially rotated from the position of Fig. 18 whereby the plug 61 is lifted and the portions 62 and 63 are forced through the openings 43 and 44 to engage the ice unit and in Fig. 25 the plug has been forced to its maximum uppermost position, rocking the ice units to break the contact between the units and the compartment walls whereby the units may be quickly removed in a manner previously described.

The handle 59 is shown in Fig. 26 is provided with a hub 64 having a camming portion 65 whereby, upon moving the handle 59 from its supporting lug 66 to the position illustrated in Fig. 26, the contact between the tray and the evaporator will be broken, permitting the tray to be easily removed. Thus, a dual function is accomplished by the rotation of the handle breaking the contact between the tray and evaporator and between the ice units and the compartment walls. The maximum force is preferably applied for breaking the contact between the ice units and compartment walls subsequent to breaking the contact between the ice tray and evaporator to equalize the effort required to move the handle. A lug 67 supports the handle 59 in the operated position.

It will be noted that the use of a rubber plug prevents even a small amount of ice being formed between the metal parts of the ice unit removing means which might prevent free operation of these means.

Although I have illustrated the compartment walls as being substantially semi-cylindrical, I contemplate that these walls might be formed of combined plane and curved surface or be of polygonal shape by employing a plurality of plane surfaces without affecting the manner of removing the ice units in any appreciable degree.

Referring now to Figs. 19 and 22 inclusive, I have shown a plurality of rubber plugs wherein the keystone portion including the arcuate surfaces 62 and 63 are the same but the stem portions, indicated at 68, 69, 70 and 71, are successively decreased in height whereby the substantially upwardly thrust of a plug for a given movement of handle 59 may be varied since the plug having the longest shank, as illustrated in Fig. 19, would first have its shank portion compressed to a certain degree before the plug portion which is relatively incompressible, would expand into the compartments 41 and 42 with sufficient force to break the contact of the ice units with the compartment walls. Thus, for a given movement of the crank portion of the shaft and a resultant vertical upward movement of the pusher element 60, the plug having the shortest shank, as illustrated in Fig. 22, would first effect breaking of the contact between the ice units and its associated compartment and the plugs having successively longer shanks as illustrated in Figs. 21, 30 and 19, would successively break the contact of the ice units with their associated compartment walls. I preferably dispose the plugs so that a group of four adjacent compartments will have the same size plug, as for example, the four compartments shown on the left hand end of Fig. 17 would be provided with the plug illustrated in Fig. 19, the next group of four compartments to the right would be provided with the type plug illustrated in Fig. 20, the next group of four compartments to the right would be provided with the type plug illustrated in Fig. 21, and the remaining group of compartments would be provided with the type plug illustrated in Fig. 22. Although I prefer that the ice units in the grouped compartments be consecutively operated upon to break the contact with their associated compartment walls, since this minimizes the effort required to operate handle 59, I contemplate that all the ice units may be concurrently operated upon to break the contact with their compartment walls by employing a similar type plug in each compartment.

In Fig. 27, a refrigerator cabinet, the door of the same, the cowl, the instrument panel, the dash of an automobile, and the attaching means, are shown in a schematic manner, and the ice tray of my invention is shown disposed in said cabinet. It is to be noted that this cabinet is disposed in an inclined position and that the ice tray is disposed in a corresponding inclined position resulting in a downward movement of the water in the ice tray so that there is more water at the rear end of each compartment than at the forward end of the same.

It is to be noted, also, that there are no communicating holes used between the eight individual compartments shown in this figure, since the use of holes in an ice tray disposed in this position would permit the water from the more forwardly disposed compartments to flow and accumulate in the more rearwardly disposed compartments, and when the ice tray compartments were fairly well filled with water, it is possible that enough water would flow into the rearmost compartments to freeze the cover to these compartments.

The forms of my invention described herein are susceptible of being formed largely from die-cast and sheet metal parts, and may be assembled in a relatively simple manner.

Although I have described the forms of my invention in connection with a refrigerant system for an automotive vehicle, since it has particular advantages in connection with a system of this type, it will be apparent that the invention also possesses distinct advantages when used with a stationary type refrigerant system.

Reference is hereby made to my Patents Nos. 2,169,332, 2,169,333 and 2,169,334, each of which issued on August 15, 1939, and to my Patent No. 2,191,102, issued February 20, 1940, and to my co-pending application Serial No. 205,707, filed May 3, 1938, wherein I reserve the right to claim patentable subject matter disclosed herein, in whole or in part, though not claimed herein, the invention claimed herein being more particularly limited to refrigerator cabinet tray means, as claimed.

Although I have shown and described preferred forms of my invention, I contemplate that numerous and extensive departures may be made therefrom without departing from the spirit of my invention and the scope of the appended claims.

Having thus described my invention, what I claim is:

1. A tray comprising a liquid receiving compartment, the compartment having interior walls defining a division of space produced by the rotation of an isosceles trapezoid about its long base to provide a similarly formed frozen unit which may be removed from the compartment by exerting pressure eccentrically of the unit, its exterior walls comprising relatively thin arcuately laterally divergent side walls, and a bottom wall of substantially lesser width than the overall width of the compartments in more upwardly disposed portions, its bottom surface being substantially flat whereby intimate thermal engagement may be had with a flat refrigerating surface on which the tray is placed.

2. A tray comprising a liquid receiving compartment, the compartment having interior walls defining a division of space produced by the rotation of an isosceles trapezoid about its long base to provide a frozen unit of substantially arcuate form which may easily be removed from the compartment by pressure communicated against the unit in such a direction as to rotate the same about an axis substantially corresponding to the above assumed position of said long base, its exterior walls comprising relatively thin arcuately laterally divergent side walls, and a bottom wall of substantially lesser width than the overall width of the compartments in more upwardly disposed portions, its bottom surface being substantially flat whereby intimate thermal engagement may be had with a flat refrigerating surface on which the tray is placed.

3. A tray comprising a plurality of liquid receiving compartments, each of the compartments being provided with a perforation within a lateral wall of the same, lifting means disposed longitudinally of the tray, a plurality of co-operating lifting elements, each element adapted to be projected through a different one of said perforations by said longitudinally disposed lifting means to exert lifting force upon a frozen unit disposed in each of said compartments.

4. A tray comprising a plurality of liquid receiving compartments, each of the compartments being provided with a perforation within a lateral wall of the same, lifting means disposed longitudinally of the tray, a plurality of resilient cooperating lifting elements, each resilient element being adapted to be projected through a different one of said perforations by the longitudinally disposed lifting means to exert lifting force upon a frozen unit disposed in each of said compartments.

5. A tray comprising a plurality of liquid receiving compartments, each of the compartments being provided with a perforation within a wall of the same, lifting means disposed longitudinally of the tray, a plurality of lifting elements adapted to be projected into different of said perforations and to remain sealingly engaged with said perforations.

6. A tray comprising a plurality of non-intercommunicating liquid receiving compartments, each of the compartments being provided with a perforation within a lateral wall of the same, lifting means disposed longitudinally of the tray and operable exteriorly thereof, a plurality of resilient co-operating elements of approximately keystone form, each resilient element adapted to be projected through a different one of said perforations by the lifting means to exert lifting force upon a frozen unit disposed in each of said compartments.

7. A liquid receiving tray, the front wall of said tray being provided with a handle pivotally secured thereto provided with an eccentric portion adapted to engage the tray support whereby gradual lifting of the forward end of the tray is effected, a pair of stops provided on the front wall of the tray, one of said stops adapted to support said handle in its non-operative position and the other of said stops adapted to support said handle in its operated position.

8. A tray having a plurality of liquid receiving compartments, each of the compartments being provided with a perforation within a lateral wall of the same, shaft means disposed longitudinally of the tray having spaced eccentric portions, a plurality of pusher elements each vertically movable by a different eccentric shaft portion, a plurality of sealing plugs one in each perforation, adjacent pairs of said plugs being engageable by a single pusher element to exert pressure on an exterior surface of said plugs, said plugs communicating said pressure to ice units frozen within compartments of said tray to initially break adherence of said units from interior walls of said compartments preliminary to removing said units from said tray.

9. The combination of an ice tray having a plurality of non-intercommunicating compartments, means movable through a wall of a compartment for breaking contact between an ice unit and the compartment walls, means disposed at an end of the tray for lifting the tray end from a supporting surface, and a common handle for operating the breaking means and lifting means.

10. In combination with a tray of the class described, a cover removably carried thereby, a sealing gasket interposed between peripheral edges of the tray and cover, handle means on the tray, and cooperative clamping means on the cover and tray cooperating with said handle means, adapted to removably clamp the cover and the gasket to the tray.

11. A tray of the class described comprising a plurality of non-intercommunicating liquid receiving compartments, a cover removably carried thereby, gasket sealing means engageable with the peripheral edges of each of said tray compartments and with the peripheral edges of said tray, said cover adapted to be superposed over said tray with said sealing means interposed between said cover and said tray, said cover adapted to make sealing compressing engagement of the sealing gasket portions engaged with the peripheral edges of each of said compartments and of said tray, an outwardly protruding element for an end wall of said tray positioned adjacent its upper outer edge, and clamping means on the cover and on the tray cooperating with said outwardly protruding element adapted to clamp the cover and sealing gasket means to the tray, whereby each of said compartments is individually closed by operation of said clamping means.

12. In an ice tray comprising a plurality of adjacent relatively longitudinally disposed liquid receiving compartments, each of said compartments having tray partitioning end walls, relatively thin arcuately laterally divergent side walls, and an intermediate bottom wall, all of said walls being of metallic integral construction, said bottom wall being of substantially lesser width than the over-all width of the compartment in more upwardly disposed portions, and at least nearly throughout its entire area being of substantially greater thickness than said side walls, the bottom surface of said bottom wall being substantially flat and adapted to make intimate thermal engagement with a flat refrigerating surface on which said tray is placed, whereby heat may be efficiently thermally conducted from each of said compartments to an underlying supporting refrigerating surface.

13. A tray comprising a liquid receiving compartment, the compartment having interior walls defining a division of space produced by the rotation of an isosceles trapezoid about its long base to provide a similarly formed frozen unit which may easily be removed from the compartment by exerting pressure eccentrically of the unit, a plug normally filling an aperture of the wall of said compartment adapted to present a portion exteriorly of the compartment adapted to be subjected to manually effected pressure, said plug communicating such pressure inwardly to the unit through the aperture in such a direction as to tend to rotate the unit about the axis produced by the rotation of said isosceles trapezoid.

14. A tray comprising a liquid receiving compartment, a wall of said compartment having an opening provided therethrough, a plug normally closing said opening adapted to present a portion exteriorly of the compartment adapted to be subjected to manually effected pressure, said plug communicating such pressure inwardly through the opening to a surface of a frozen unit formed in said compartment to break the bond between said unit and said compartment walls.

15. A liquid receiving tray comprising a plurality of non-interconnecting liquid receiving compartments, a cover therefore, sealing means adapted to engage the top peripheral surfaces of the tray and the top peripheral surfaces of each of the compartments thereof, locking means associated with said tray and cover adapted to engage both said end wall portions of said tray in a manner to securely individually seal said tray compartments.

OSCAR U. ZERK.